United States Patent Office.

ELIAS INGRAHAM, OF BRISTOL, CONNECTICUT.

Letters Patent No. 113,772, dated April 18, 1871.

IMPROVEMENT IN THE APPLICATION OF BRONZE AND GILDING TO PLATE GLASS.

The Schedule referred to in these Letters Patent and making part of the same.

I, ELIAS INGRAHAM, of Bristol, in the county of Hartford and State of Connecticut, have invented a new and improved Process for the Embellishment of Glass for Clock-Tablets, &c., of which the following is a specification.

My invention relates to the embellishment of the inner surface of plate-glass in bronze and gilt, the same being exposed to view from the outer side, and showing through the glass plate, and consists in the peculiar process hereinafter described, to wit:

The glass plate is first perfectly cleaned in the usual manner and then laid upon the table of a transferring-machine provided with a figure-plate or engraving and an elastic roller, said machine being the same as now in common use for such purposes. A size composed of Damar varnish and fat, oil, or other suitable material, is then applied to the figure-plate, (the figure on said plate consisting of the main lines for forming the desired design,) when the elastic roller is caused to traverse over and in contact with the figure-plate, and thus transfer said size to the roller, which then passes over the glass plate in like manner and transfers the size to the said plate in the exact likeness of the face of the figure-plate or engraving.

Immediately thereafter, and before the size is dry, the back of the glass plate, or that portion of it which contains the figure printed in size, is rubbed over with bronze, which bronze adheres to the size, when the plate is laid away to dry, and may be said to be in the first stage of the process.

When dry, a weak solution of fish-glue and water, or other appropriate transparent adhesive size, is then applied to the bronzed or back side of the glass plate, when a sheet of gilt or gold-leaf is applied thereto and the glass plate again laid away to dry, being in the second stage of the process.

The bronzed figure applied, as before described, being slightly raised from the surface of the glass plate, and the sheet of gilt or gold-leaf being so delicate and thin, the bronzed figure shows equally as plain and distinct through the gold-leaf upon the back of the glass plate as it did before said gold-leaf was applied.

When again dry, a size composed of asphaltum cut with turpentine, or some other suitable size, paint, or composition is applied with a suitable brush to all that portion of the bronzed figure on the glass plate inclosed by the outlines, and also for a short distance outside of said bronzed figure. Thus it will be seen that, by allowing the size to be applied a little outside of said bronzed figure, and depending upon said bronze to give the characteristic features of the design, unskilled labor may be employed to apply this asphaltum size.

If it is also desired to leave a circle of gilt or gold-leaf around the main design, the glass plate is laid central upon a revolving table, when a brush dipped in asphaltum is held upon the plate as the table and plate revolve and leave a circle of asphaltum applied to the back of the gilt. The plate is then laid away to dry, being now in the third stage of the process.

When dry, the surplus gilt or gold-leaf, to wit, that portion of it not backed by the asphaltum size, is then rubbed off, leaving the bronze figure having a dead surface filled in and bordered with a burnished or brilliant surface of gold-leaf, which constitutes the fourth stage of the process.

If desired, the whole back of the glass plate may be protected or covered by a coat of paint, which I consider desirable, but not essential, to the other parts of this process.

My process has these peculiar features, viz., that the figure is formed upon the glass plate prior to the application thereto of the gold-leaf; that the figure so applied shows distinctly through the gold-leaf upon the back of the glass plate after being covered by said gold-leaf, and forms a guide by which an unskilled workman may apply the size which backs and holds the gold-leaf; and that the process produces a design or figure in bronze and gilt having both a dead and a brilliant surface.

I do not claim each distinct stage of the process as being new when separately considered; but

What I claim as my invention is—

The process of decorating glass plate in bronze and gilt, substantially as herein described.

ELIAS INGRAHAM.

Witnesses:
 A. L. ATWOOD,
 JAMES SHEPARD.